US012590801B2

(12) United States Patent
Sena et al.

(10) Patent No.: US 12,590,801 B2
(45) Date of Patent: Mar. 31, 2026

(54) REAL TIME DETERMINATION OF PEDESTRIAN DIRECTION OF TRAVEL

(71) Applicant: Apple Inc., Cupertino, CA (US)

(72) Inventors: Mark P. Sena, Larkspur, CA (US); Jaehyun Bae, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 147 days.

(21) Appl. No.: 18/205,480

(22) Filed: Jun. 2, 2023

(65) Prior Publication Data

US 2023/0392932 A1 Dec. 7, 2023

Related U.S. Application Data

(60) Provisional application No. 63/349,012, filed on Jun. 3, 2022.

(51) Int. Cl.
*G01C 21/16* (2006.01)

(52) U.S. Cl.
CPC ..................................... *G01C 21/16* (2013.01)

(58) Field of Classification Search
CPC ...................................................... G01C 21/16
See application file for complete search history.

(56) References Cited

U.S. PATENT DOCUMENTS

| | | | |
|---|---|---|---|
| 9,579,048 B2 * | 2/2017 | Rayner ................ | A61B 5/7455 |
| 11,106,893 B1 * | 8/2021 | Zhu .................... | G06Q 30/0207 |
| 11,426,630 B1 * | 8/2022 | Chuang .............. | A63B 24/0062 |
| 12,135,213 B1 * | 11/2024 | Grundy ................ | G01C 21/16 |
| 2007/0300043 A1 * | 12/2007 | Moyer ................. | G06F 9/3001 |
| | | | 712/E9.046 |
| 2019/0379683 A1 * | 12/2019 | Overby .............. | G06F 9/45533 |
| 2019/0389600 A1 * | 12/2019 | Troy ..................... | G06T 19/003 |
| 2020/0082248 A1 * | 3/2020 | Villegas ................ | G06N 3/044 |
| 2023/0158916 A1 * | 5/2023 | Haupt .................... | B60L 53/60 |
| | | | 320/109 |
| 2023/0392932 A1 * | 12/2023 | Sena ...................... | G01C 21/16 |
| 2024/0003707 A1 * | 1/2024 | Gao ...................... | G01S 5/0036 |

OTHER PUBLICATIONS

Erhard Wieser, Philipp Mittendorfer, and Gordon Cheng, Accelerometer based robotic Joint Orientation Estimation, 2011 11th IEEE-RAS International Conference on Humanoid Robots Bled, Slovenia, Oct. 26-28, 2011 https://ieeexplore.ieee.org/stamp/stamp.jsp?tp=&arnumber=6100820.*
NPL, Gietzelt, et al., Performance comparison of accelerometer calibration algorithms based on 3D-ellipsoid fitting methods 2013.*
Analog devices, AN-2554: Step Counting Using the ADXL367.*

* cited by examiner

*Primary Examiner* — Jean Paul Cass
(74) *Attorney, Agent, or Firm* — Fish & Richardson P.C.

(57) ABSTRACT

Embodiments are disclosed for real time estimation of DoT. In some embodiments, a method comprises: obtaining inertial acceleration data from a motion sensor of a mobile device worn or held by a user; computing a frequency spectrum of the acceleration data to generate horizontal and vertical frequency components at a step frequency of the user; constructing an acceleration trajectory of the horizontal frequency components in a horizontal reference frame, the horizontal frequency components forming an ellipse in the horizontal reference frame; determining a maximum radius vector of the ellipse; determining an angle to DoT based on the maximum radius vector; disambiguating a sign of the angle; and determining the disambiguated angle as the DoT.

12 Claims, 8 Drawing Sheets

ACC TRAJECTORY IN DoT

LEFT STEP      RIGHT STEP

◄— POSTERIOR            ANTERIOR —►

ACC TRAJECTORY IN SIDE DIRECTION

RIGHT STEP      LEFT STEP

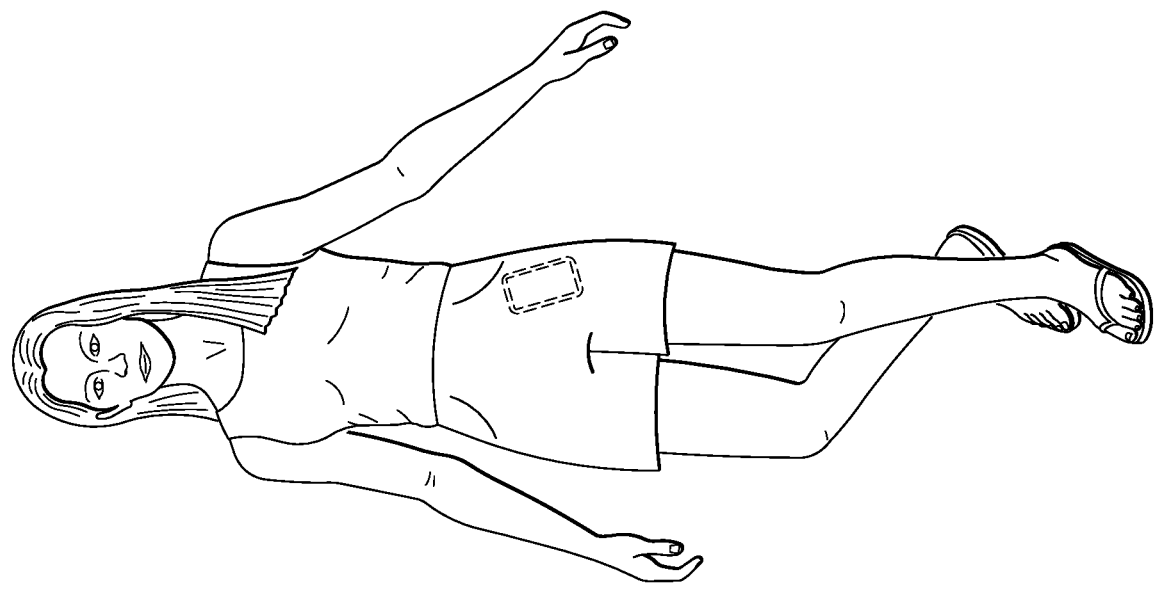
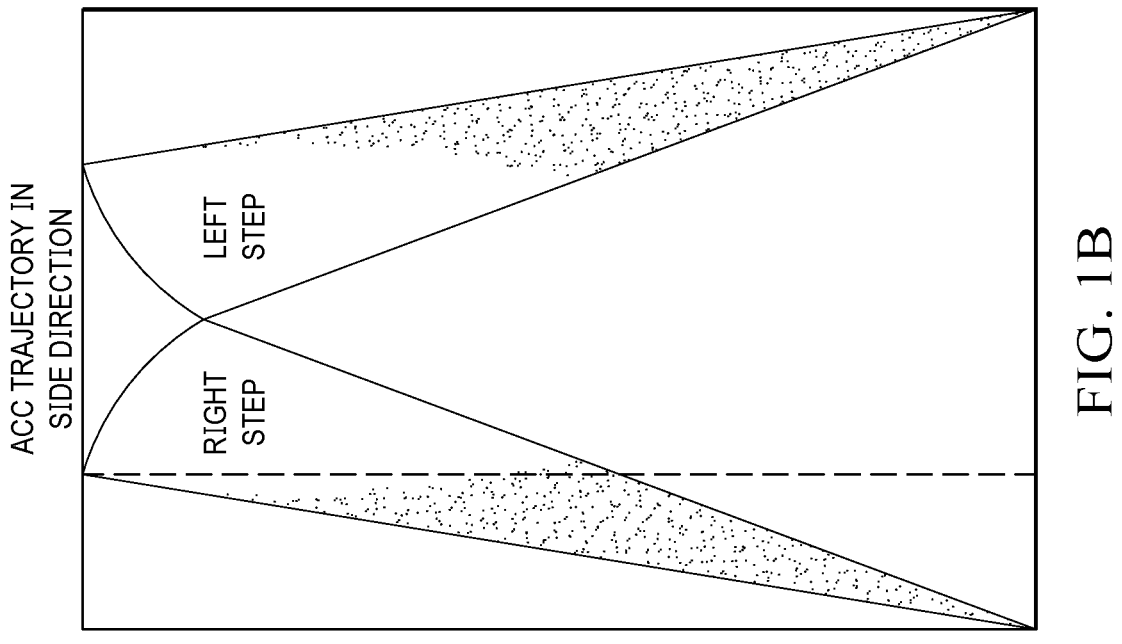
FIG. 1B

200

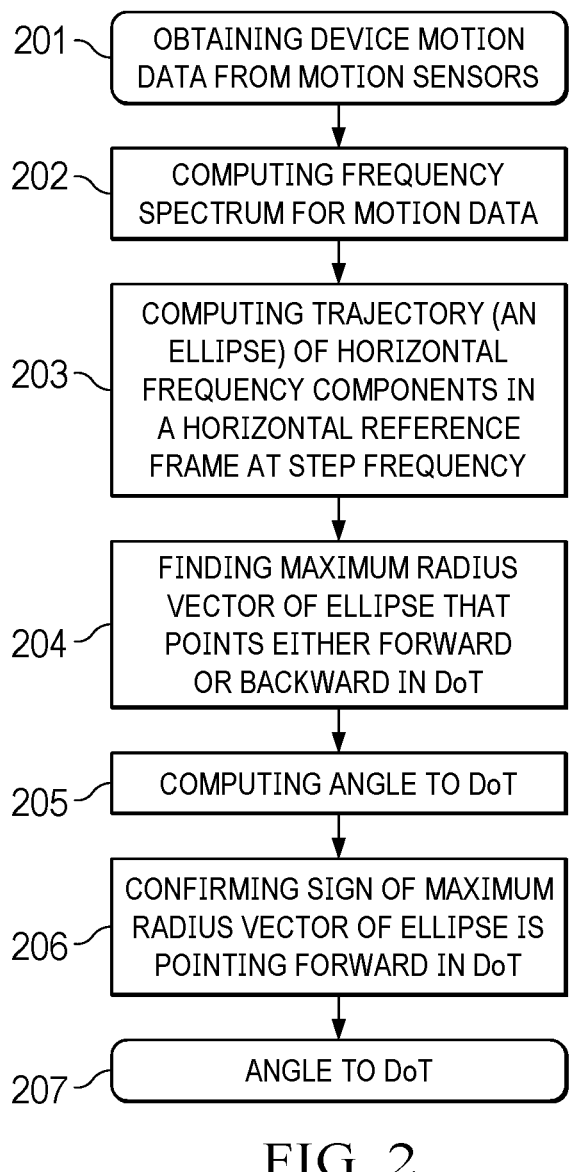

201 — OBTAINING DEVICE MOTION DATA FROM MOTION SENSORS

202 — COMPUTING FREQUENCY SPECTRUM FOR MOTION DATA

203 — COMPUTING TRAJECTORY (AN ELLIPSE) OF HORIZONTAL FREQUENCY COMPONENTS IN A HORIZONTAL REFERENCE FRAME AT STEP FREQUENCY

204 — FINDING MAXIMUM RADIUS VECTOR OF ELLIPSE THAT POINTS EITHER FORWARD OR BACKWARD IN DoT

205 — COMPUTING ANGLE TO DoT

206 — CONFIRMING SIGN OF MAXIMUM RADIUS VECTOR OF ELLIPSE IS POINTING FORWARD IN DoT

207 — ANGLE TO DoT

FIG. 2

FIG. 3B
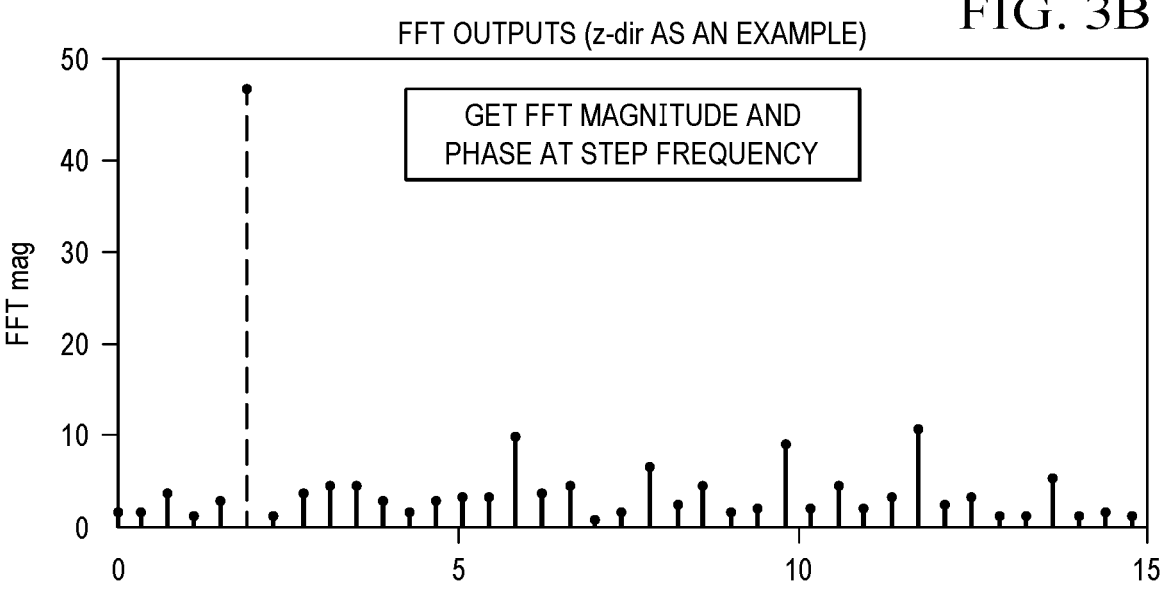
FFT OUTPUTS (z-dir AS AN EXAMPLE)
GET FFT MAGNITUDE AND
PHASE AT STEP FREQUENCY
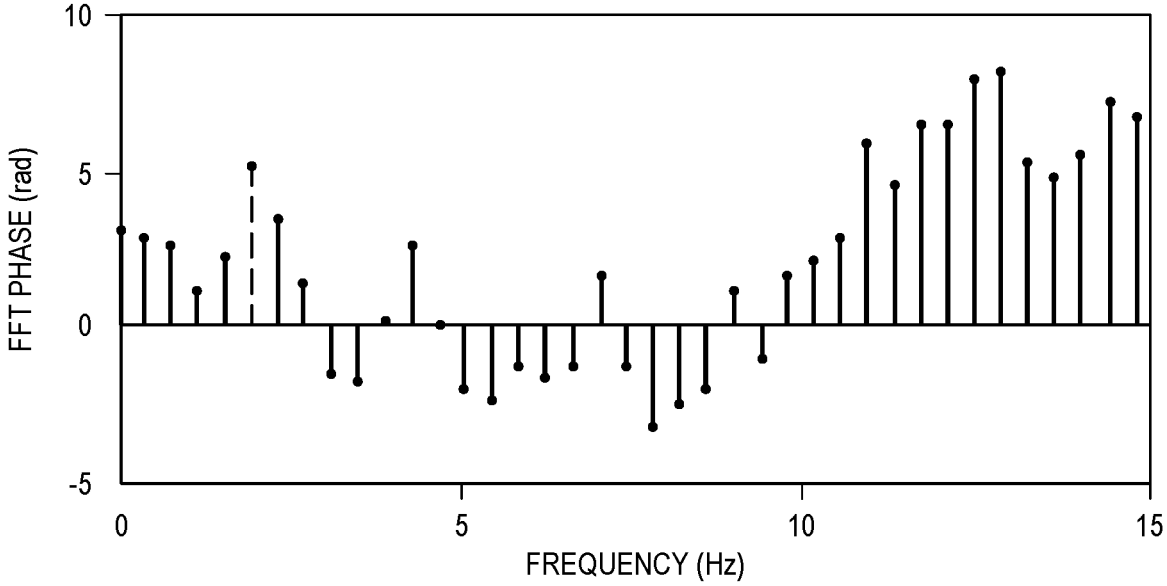

REAL TIME DETERMINATION OF PEDESTRIAN DIRECTION OF TRAVEL

CROSS-RELATED APPLICATION

This application claims the benefit of U.S. Provisional Application No. 63/349,012, for "Methods for Real Time Determination of Pedestrian Direction of Travel," filed Jun. 3, 2022, which patent application is incorporated by reference herein in its entirety.

TECHNICAL FIELD

This disclosure relates generally to real time estimation of pedestrian direction of travel.

BACKGROUND

Some mobile applications require knowledge of whether a user is currently walking, their walking speed and their direction of travel (DoT). For example, walking speed and DoT may be used in a pedestrian dead reckoning mobile application for tracking and mapping a user's trajectory which can be presented to the user on a display of the user's mobile device 9 e.g., smart phone smartwatch). DoT may also be used to analyze the user's walking gait for health monitoring (e.g., fall detection and walking steadiness estimation) and/or fitness applications. DoT may also be used in spatial audio applications to determine if the user is walking away from a source device (e.g., a computer tablet) to disable spatial audio associated with content playing on the source device.

SUMMARY

Embodiments are disclosed for real time estimation of DoT.

In some embodiments, a method comprises: obtaining, with at least one processor, inertial acceleration data from a motion sensor of a mobile device worn or held by a user; computing, with at least one processor, a frequency spectrum of the acceleration data to generate horizontal and vertical frequency components at a step frequency of the user; constructing, with the at least one processor, an acceleration trajectory of the horizontal frequency components in a horizontal reference frame, the horizontal frequency components forming an ellipse in the horizontal reference frame; determining, with the at least one processor, a maximum radius vector of the ellipse; determining, with the at least one processor, an angle to DoT based on the maximum radius vector; disambiguating, with the at least one processor, a sign of the angle; and determining, with the at least one processor, the disambiguated angle as the DoT.

In some embodiments, the method further comprises disambiguating, with the at least one processor, a sign of the angle; and determining, with the at least one processor, the disambiguated angle as the DoT.

In some embodiments, disambiguating the sign of the angle includes determining if a change in the vertical frequency component is greater than zero.

In some embodiments, the step frequency is determined by a pedometer of the mobile device.

Other embodiments are directed to an apparatus, system, and computer-readable medium.

Particular embodiments described herein provide one or more of the following advantages. Acceleration data generated by motions sensors (e.g., accelerometers) is readily available on most mobile device, such as smartphones. The acceleration data can be used to estimate DoT in real-time without the need for additional hardware or complex software algorithms. Unlike other methods, the disclosed embodiments (e.g., sign disambiguation) can distinguish between walking forward and backward automatically. Unlike time-domain methods, the disclosed embodiments are based in the frequency-domain resulting in a more computationally efficient approach that does not require complex segmentation and peak-finding logic.

BRIEF DESCRIPTION OF THE DRAWINGS

FIGS. 1A-1C illustrate the use of walking biomechanics and frequency spectrum analysis for determination of DoT, according to one or more embodiments.

FIG. 2 is a flow diagram of a process for real-time determination of DoT, according to one or more embodiments.

FIGS. 3A-3C illustrate a process for real-time determination of DoT including graphical illustrations, according to one or more embodiments.

DETAILED DESCRIPTION

Pedestrian Biomechanics and Spectrum Analysis

Figure 1A:
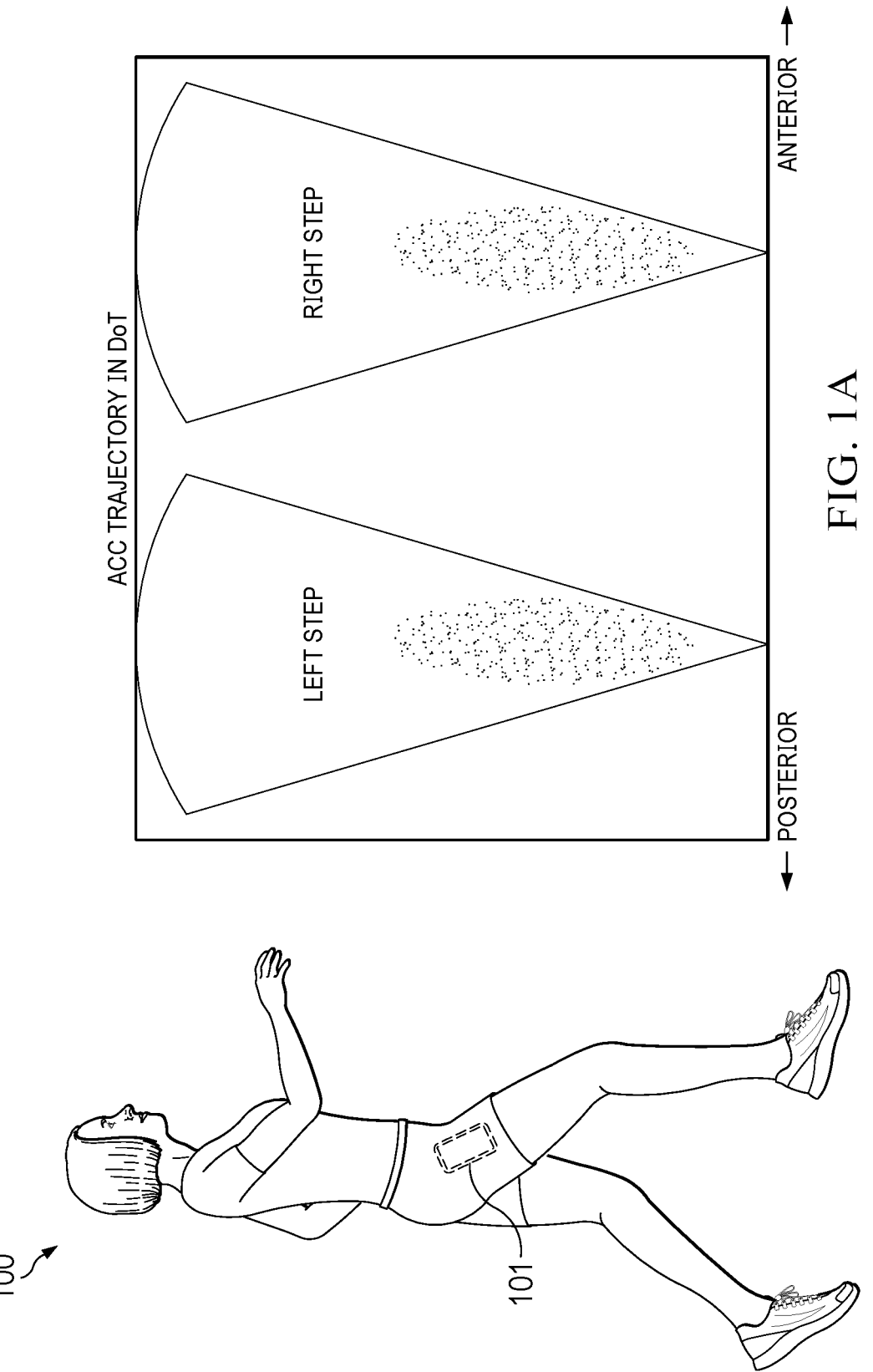
Figure 1C:
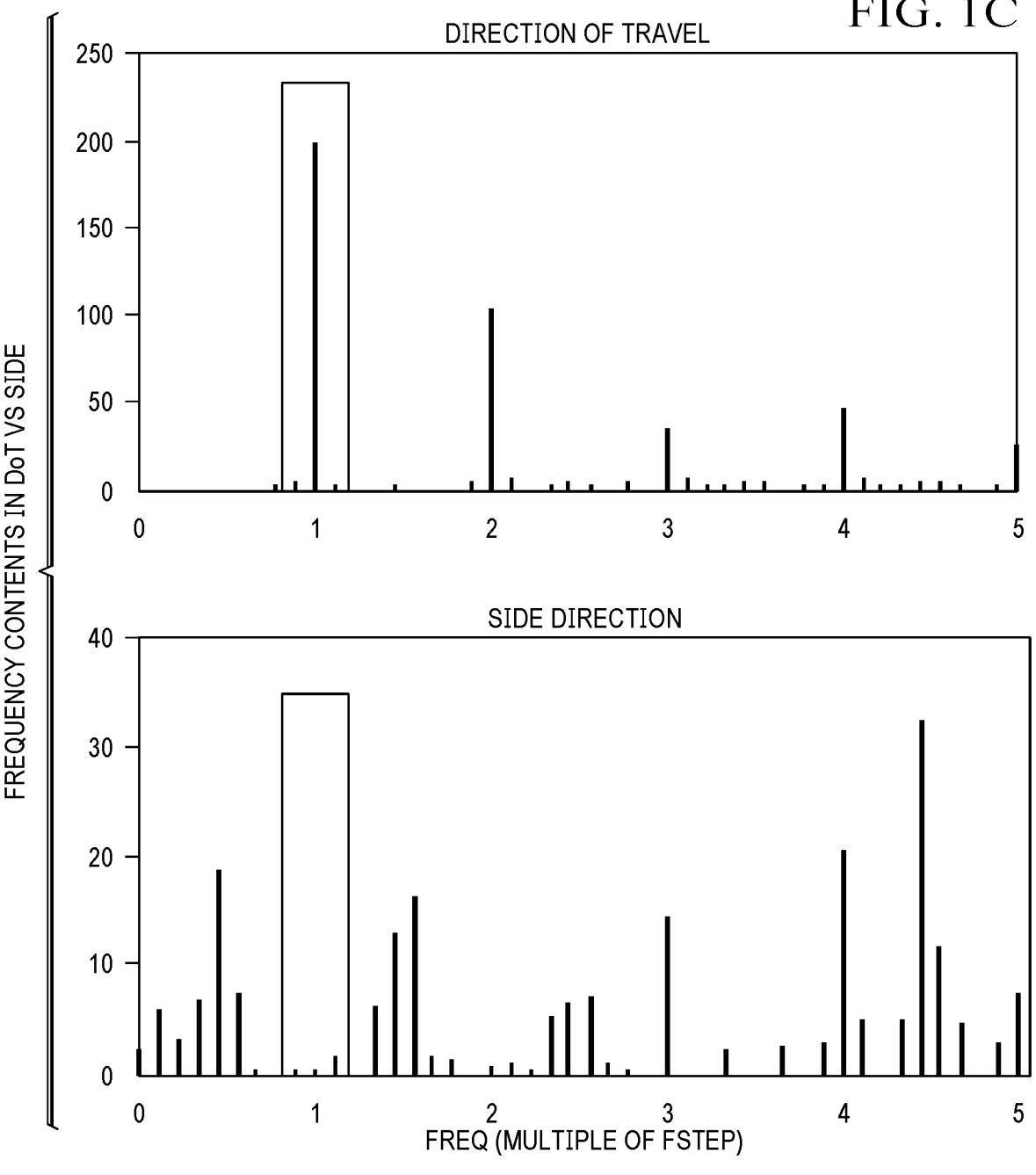

FIGS. 1A-1C illustrate the use of walking biomechanics and frequency spectrum analysis for determination of DoT, according to one or more embodiments.

Referring to FIG. 1A, user 100 is shown with a mobile device 101 in their front pocket. Mobile 101 includes inertial sensors such as accelerometers and gyros. When user 100 is walking the motion of mobile device 101 can be modeled as a reverse pendulum. In the DoT, the acceleration trajectories are the same for left and right steps with a dominant frequency at the step frequency ($f_{step}$), as shown in the top plot of FIG. 1C.

Referring to FIG. 1B, in the side directions, the acceleration trajectories are opposite for left and right steps with a dominant frequency at one half the step frequency ($\frac{1}{2} f_{step}$). Accordingly, the frequency content at $f_{step}$ is maximum in DoT and minimum in the side direction, as shown in the top and bottom plots of FIG. 1C.

Example Process for Real-Time Determination of DoT

FIG. 2 is a flow diagram of a process 200 for real-time determination of DoT, according to one or more embodiments.

Process 200 starts by obtaining accelerometer data from accelerometers of a mobile device worn on the body of a user (e.g., in a pants pocket). The acceleration signal can be obtained at a predetermined epoch (201) (e.g., every 2.56 seconds).

Process 200 continues by computing a frequency spectrum for the acceleration data (202) (e.g., using a fast Fourier transform (FFT)) to obtain horizontal and vertical frequency components, computing a trajectory of horizontal frequency components in a horizontal reference frame, which is an ellipse in the x-y plane defined by the horizontal or x and y frequency components at $f_{step}$ (203).

Process 200 continues by finding a maximum radius vector of the ellipse that points either forward or backward in the DoT (204) and computing an angle θ to the DoT which is the angle between the maximum radius vector and the forward frequency component (x frequency component) (205). The angle can be determined from the ellipse by:

$$\theta = \tan^{-1} \frac{y_{max}}{x_{max}}.$$

Process 200 continues by confirming that the sign of the maximum radius vector of the ellipse is pointing forward in the Dot (206). For example, the sign of the maximum radius vector of the ellipse can be disambiguated by determining if a change of the vertical acceleration component at the maximum radius vector ($\dot{z}_{max}$) is greater than zero ($\dot{z}_{max} > 0$). The angle to DoT (207) can be made available to one or more applications running on the mobile device through, e.g., an application programming interface or software framework.

Figure 3A:
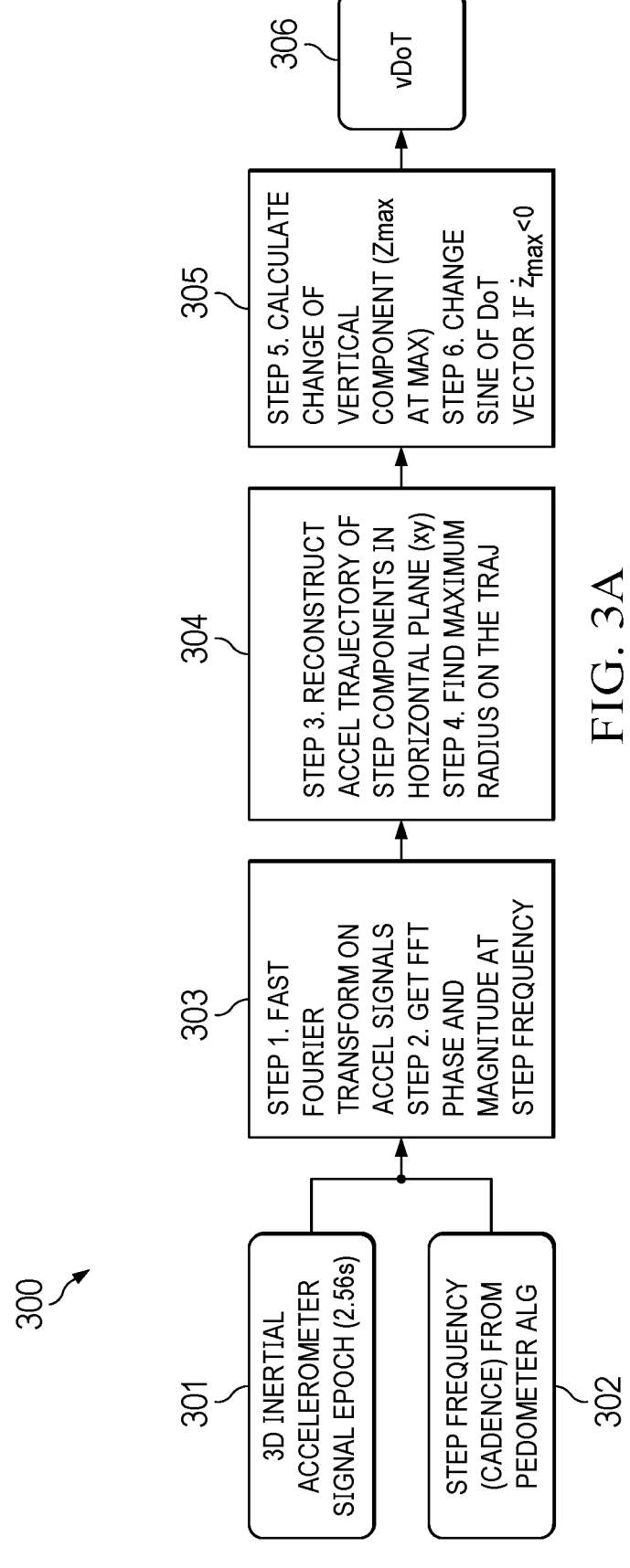
Figure 3C:
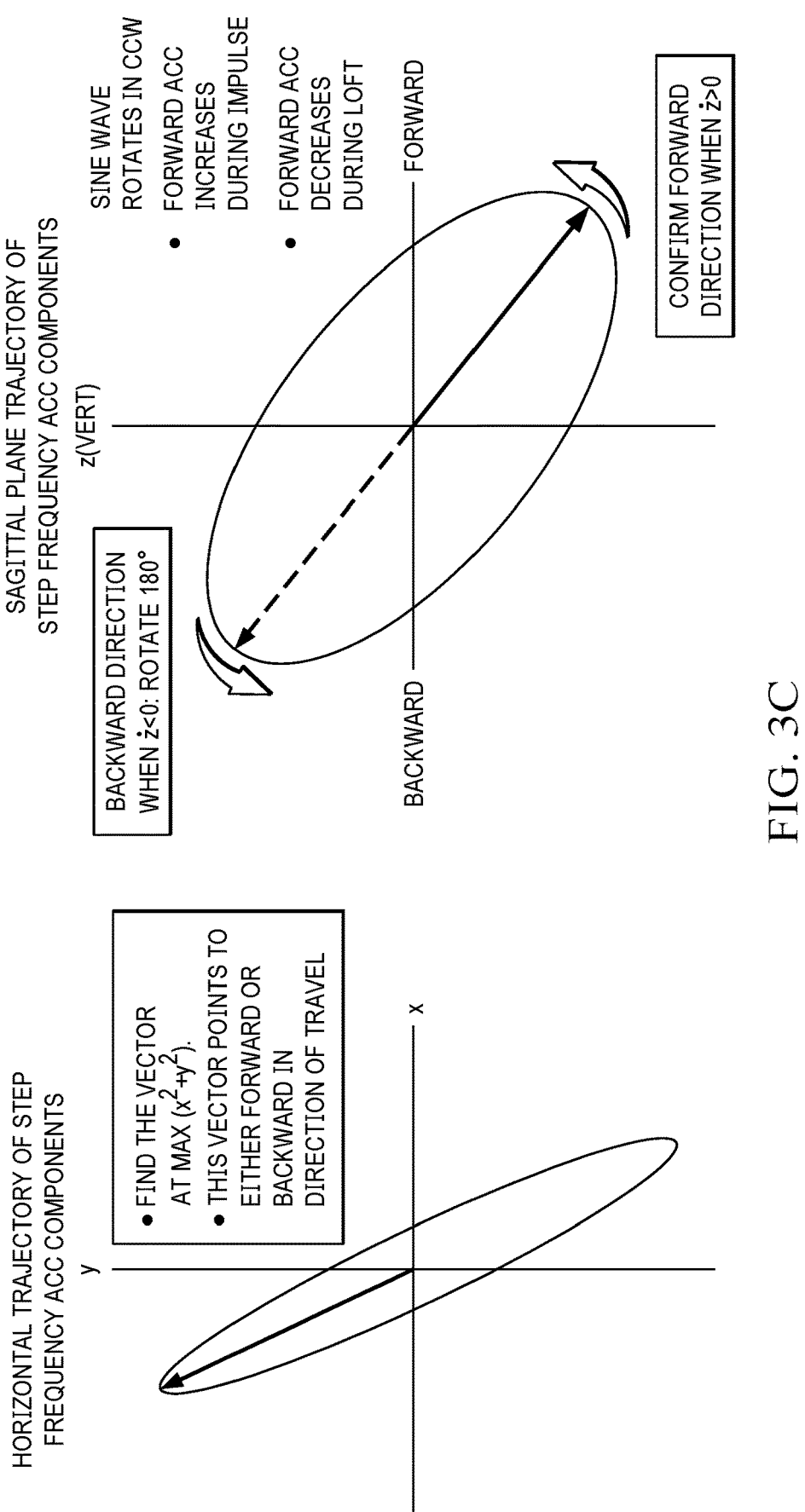

FIGS. 3A-3C illustrate a process for real-time determination of DoT including graphical illustrations, according to one or more embodiments. A three-dimensional (3D) inertial acceleration vector is obtained from a 3-axis accelerometer (301). For example, the acceleration vector is computed in sensor coordinates, transformed from sensor coordinates into body coordinates and then transformed from body coordinates to inertial coordinates with the gravity vector removed. The inertial acceleration vector is transformed into the frequency domain (302) (e.g., using an FFT), and the FFT magnitude and phase at the $f_{step}$ is retrieved (303), as shown in FIG. 3B which shows FFT magnitude and phase for the vertical (z frequency component). An acceleration trajectory of the horizontal frequency components (x and y frequency components) is constructed in the horizontal plane or x-y plane), forming an ellipse, and a maximum radius vector of the ellipse at max ($x^2 + y^2$) is determined that points either forward or backward in the DoT (304), as shown in FIG. 3C.

It is noted that forward acceleration increases during an impulse (when the left/right foot contact the ground) and decreases during loft (when the left/right foot leaves the ground). Accordingly, this characteristic of biomechanics allows the vertical or z component to be used to disambiguate the sign of the angle θ between the maximum radius vector of the ellipse and the DoT (x frequency component). More particularly, a change of the vertical frequency component ($\dot{z}_{max}$ is determined at the maximum radius vector of the ellipse, and the sign of the DoT vector is changed if $\dot{z}_{max} > 0$ (305). An angle $$\theta \left( \theta = \tan^{-1} \frac{y_{max}}{x_{max}} \right)$$

between the maximum radius vector of the ellipse and the forward (x frequency component) is determined from the ellipse (306), which defines the desired DoT. The DoT can be made available to one or more applications running on the mobile device through, e.g., an application programming interface or software framework.

Example Mobile Device Architecture

Figure 4:
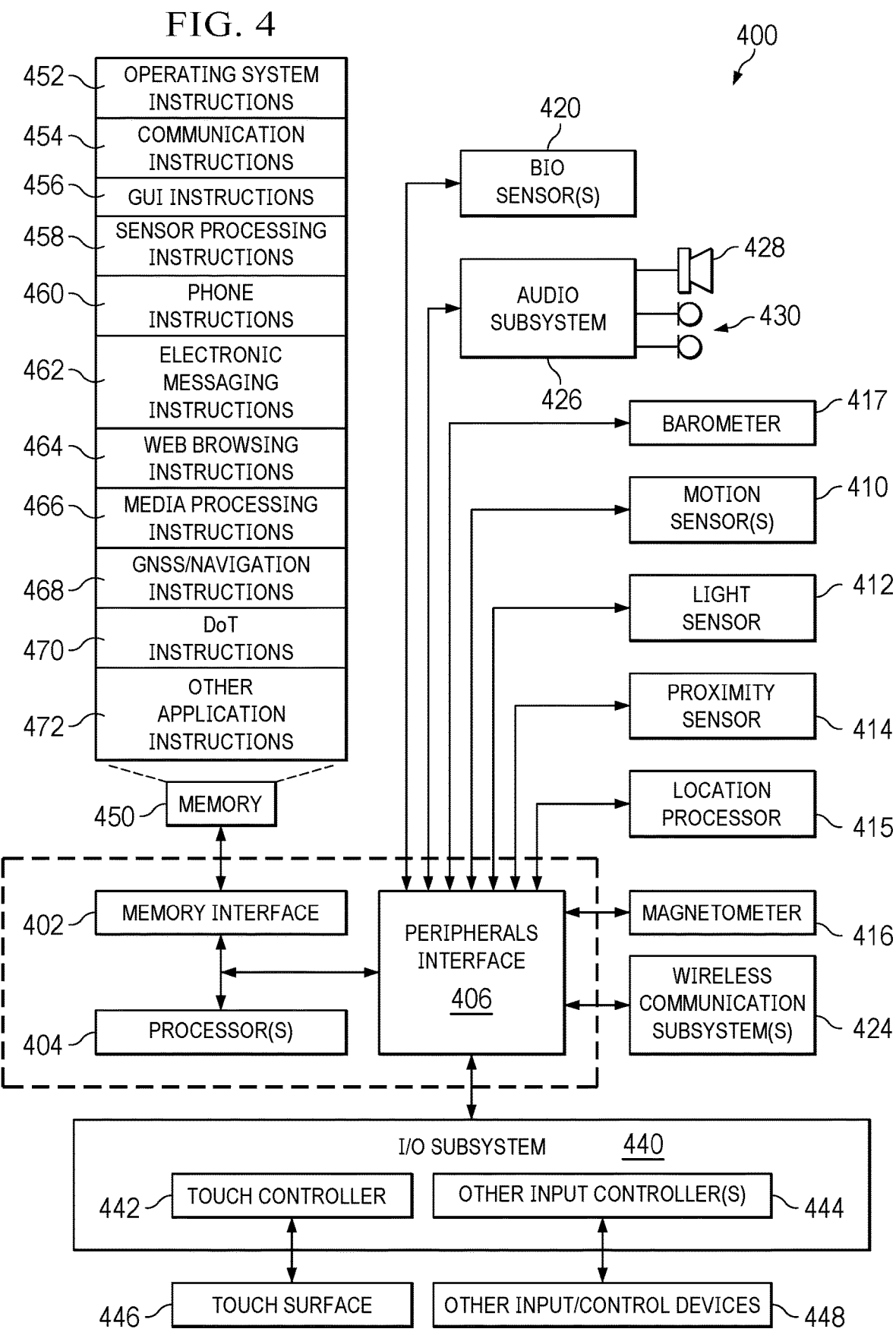
FIG. 4 is a block diagram of a mobile device architecture for implementing the system, features and processes described in reference to FIGS. 1-3.

FIG. 4 is a block diagram of a mobile device architecture for implementing the features and processes described in reference to FIGS. 1-3. Architecture 400 can include memory interface 402, one or more hardware data processors, image processors and/or processors 404 and peripherals interface 406. Memory interface 402, one or more processors 404 and/or peripherals interface 406 can be separate components or can be integrated in one or more integrated circuits. System architecture 400 can be included in any suitable electronic device for crash detection, including but not limited to: a smartwatch, smartphone, fitness band and any other device that can be attached, worn, or held by a user.

Sensors, devices, and subsystems can be coupled to peripherals interface 406 to provide multiple functionalities. For example, one or more motion sensors 410, light sensor 412 and proximity sensor 414 can be coupled to peripherals interface 406 to facilitate motion sensing (e.g., acceleration, rotation rates), lighting and proximity functions of the wearable device. Location processor 415 can be connected to peripherals interface 406 to provide geo-positioning. In some implementations, location processor 415 can be a GNSS receiver, such as the Global Positioning System (GPS) receiver. Electronic magnetometer 416 (e.g., an integrated circuit chip) can also be connected to peripherals interface 406 to provide data that can be used to determine the direction of magnetic North. Electronic magnetometer 416 can provide data to an electronic compass application. Motion sensor(s) 410 can include one or more accelerometers and/or gyros configured to determine change of speed and direction of movement. Barometer 417 can be configured to measure atmospheric pressure (e.g., pressure change inside a vehicle). Bio signal sensor 420 can be one or more of a PPG sensor, an electroencephalogram (EEG) sensor, an electrocardiogram (ECG) sensor, an electromyogram (EMG) sensor, a mechanomyogram (MMG) sensor (e.g., piezo resistive sensor) for measuring muscle activity/contractions, an electrooculography (EOG) sensor, a galvanic skin response (GSR) sensor, a magnetoencephalogram (MEG) sensor and/or other suitable sensor(s) configured to measure bio signals.

Communication functions can be facilitated through wireless communication subsystems 424, which can include radio frequency (RF) receivers and transmitters (or transceivers) and/or optical (e.g., infrared) receivers and transmitters. The specific design and implementation of the communication subsystem 424 can depend on the communication network(s) over which a mobile device is intended to operate. For example, architecture 400 can include communication subsystems 424 designed to operate over a GSM network, a GPRS network, an EDGE network, a Wi-Fi™ network and a Bluetooth™ network, 5G, 6G. In particular, the wireless communication subsystems 424 can include hosting protocols, such that the crash device can be configured as a base station for other wireless devices.

Audio subsystem 426 can be coupled to a speaker 428 and a microphone 430 to facilitate voice-enabled functions, such as voice recognition, voice replication, digital recording, and telephony functions. Audio subsystem 426 can be configured to receive voice commands from the user. Audio subsystem 426 can be used to capture audio during a crash and to convert the audio to SPL for crash detection processing.

I/O subsystem 440 can include touch surface controller 442 and/or other input controller(s) 444. Touch surface controller 442 can be coupled to a touch surface 446. Touch surface 446 and touch surface controller 442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 446. Touch surface 446 can include, for example, a touch screen or the digital crown of a smart watch. I/O subsystem 440 can include a haptic engine or device for providing haptic feedback (e.g., vibration) in response to commands from processor 404. In an embodiment, touch surface 446 can be a pressure-sensitive surface.

Other input controller(s) 444 can be coupled to other input/control devices 448, such as one or more buttons, rocker switches, thumbwheel, infrared port, and USB port. The one or more buttons (not shown) can include an up/down button for volume control of speaker 428 and/or microphone 430. Touch surface 446 or other controllers 444 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 446; and a pressing of the button for a second duration that is longer than the first duration may turn power to the mobile device on or off. The user may be able to customize a functionality of one or more of the buttons. The touch surface 446 can, for example, also be used to implement virtual or soft buttons.

In some implementations, the mobile device can present recorded audio and/or video files, such as MP3, AAC and MPEG files. In some implementations, the mobile device can include the functionality of an MP3 player. Other input/output and control devices can also be used.

Memory interface 402 can be coupled to memory 450. Memory 450 can include high-speed random-access memory and/or non-volatile memory, such as one or more magnetic disk storage devices, one or more optical storage devices and/or flash memory (e.g., NAND, NOR). Memory 450 can store operating system 452, such as the iOS operating system developed by Apple Inc. of Cupertino, California. Operating system 452 may include instructions for handling basic system services and for performing hardware dependent tasks. In some implementations, operating system 452 can include a kernel (e.g., UNIX kernel).

Memory 450 may also store communication instructions 454 to facilitate communicating with one or more additional devices, one or more computers and/or one or more servers, such as, for example, instructions for implementing a software stack for wired or wireless communications with other devices. Memory 450 may include graphical user interface instructions 456 to facilitate graphic user interface processing; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GNSS/Location instructions 468 to facilitate generic GNSS and location-related processes and instructions; and DoT instructions 470 that implement the processes described in reference to FIGS. 2-3. Memory 450 further includes other application instructions 472 including but not limited to instructions for applications that utilize DoT.

Each of the above identified instructions and applications can correspond to a set of instructions for performing one or more functions described above. These instructions need not be implemented as separate software programs, procedures, or modules. Memory 450 can include additional instructions or fewer instructions. Furthermore, various functions of the mobile device may be implemented in hardware and/or in software, including in one or more signal processing and/or application specific integrated circuits.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A method comprising:

obtaining, with at least one processor, inertial acceleration data from a motion sensor of a mobile device worn or held by a user;

computing, with at least one processor, a frequency spectrum of the acceleration data to generate horizontal and vertical frequency components at a step frequency of the user;

constructing, with the at least one processor, an acceleration trajectory of the horizontal frequency components in a horizontal reference frame, the horizontal frequency components forming an ellipse in the horizontal reference frame;

determining, with the at least one processor, a maximum radius vector of the ellipse; and determining, with the at least one processor, an angle to a direction of travel (DoT) of the user based on the maximum radius vector, wherein the angle to the DoT is used for tracking or mapping the user's trajectory, or analyzing the user's walking gait, or used for fitness or spatial audio applications.

2. The method of claim 1, further comprising:

disambiguating, with the at least one processor, a sign of the angle; and determining, with the at least one processor, the disambiguated angle as the DoT.

3. The method of claim 2, wherein disambiguating the sign of the angle includes determining if a change in the vertical frequency component is greater than zero.

4. The method of claim 1, wherein the step frequency is determined by a pedometer of the mobile device.

5. An apparatus comprising:

at least one processor;

memory storing instructions that when executed by the at least one processor, cause the at least one processor to perform operations comprising:

obtaining inertial acceleration data from a motion sensor of a mobile device worn or held by a user;

computing a frequency spectrum of the acceleration data to generate horizontal and vertical frequency components at a step frequency of the user;

constructing an acceleration trajectory of the horizontal frequency components in a horizontal reference frame, the horizontal frequency components forming an ellipse in the horizontal reference frame;

determining a maximum radius vector of the ellipse; and determining an angle to a direction of travel (DoT) of the user based on the maximum radius vector, wherein the angle to the DoT is used for tracking or mapping the user's trajectory, or analyzing the user's walking gait, or used for fitness or spatial audio applications.

6. The apparatus of claim 5, wherein the operations further comprise:

disambiguating a sign of the angle; and determining the disambiguated angle as the DoT.

7. The apparatus of claim 6, wherein disambiguating the sign of the angle includes determining if a change in the vertical frequency component is greater than zero.

8. The apparatus of claim 5, wherein the apparatus includes a pedometer, and the step frequency is determined by the pedometer.

9. A non-transitory computer-readable storage medium having instructions stored thereon, that when executed by one or more processors, perform operations comprising:

obtaining inertial acceleration data from a motion sensor of a mobile device worn or held by a user;

computing a frequency spectrum of the acceleration data to generate horizontal and vertical frequency components at a step frequency of the user;

constructing an acceleration trajectory of the horizontal frequency components in a horizontal reference frame, the horizontal frequency components forming an ellipse in the horizontal reference frame;

determining a maximum radius vector of the ellipse; and determining an angle to a direction of travel (DoT) of the user based on the maximum radius vector, wherein the angle to the DoT is used for tracking or mapping the user's trajectory, or analyzing the user's walking gait, or used for fitness or spatial audio applications.

10. The computer-readable storage medium of claim 9, further comprising:

disambiguating a sign of the angle; and determining, with the at least one processor, the disambiguated angle as the DoT.

11. The computer-readable storage medium of claim 10, wherein disambiguating the sign of the angle includes determining if a change in the vertical frequency component is greater than zero.

12. The computer-readable storage medium of claim 9, wherein the step frequency is determined by a pedometer of the mobile device.

* * * * *